United States Patent [19]

Lin et al.

[11] Patent Number: 5,657,523
[45] Date of Patent: Aug. 19, 1997

[54] POSITIONING MECHANISM OF TURRET INDEX

[75] Inventors: Ching-Yuan Lin, KaoHsiung; Win-Jim Su, Hsin Tsu, both of Taiwan

[73] Assignee: Industrial Technology Research Institute, Hsinchu, Taiwan

[21] Appl. No.: 556,752

[22] Filed: Nov. 2, 1995

[51] Int. Cl.⁶ .................................................. B23B 29/32
[52] U.S. Cl. .......................... 29/48.5 A; 29/40; 29/42; 29/27 C; 74/813 L; 74/567; 74/569
[58] Field of Search .................. 29/48.5 A, 48.5 R, 29/49, 27 C, 39, 40, 42; 74/813 L, 813 R, 567, 569

[56] References Cited

U.S. PATENT DOCUMENTS

| | | | |
|---|---|---|---|
| 3,877,323 | 4/1975 | Vetsch | 74/826 |
| 4,989,303 | 2/1991 | Sauter et al. | 29/48.5 A |
| 5,187,847 | 2/1993 | Thumm et al. | 29/48.5 A |
| 5,271,134 | 12/1993 | Schips | 29/48.5 A |
| 5,386,743 | 2/1995 | Su et al. | 74/813 L |

*Primary Examiner*—M. Rachuba
*Assistant Examiner*—Christopher Kirkman
*Attorney, Agent, or Firm*—W. Wayne Liauh

[57] ABSTRACT

A positioning mechanism of a turret index which performs index rotation by the use of an index mechanism to transmit output shaft motion and perform positioning by a three-piece toothed coupler. The present invention uses a hydraulic system to control the division and the combination of the three-piece toothed coupling to attain the turret's precise positioning and comprises a piston ring on the output shaft. The area of the piston ring's end plane which is subjected to hydraulic pressure, is greater than the area of the slider's end plane inside the three-piece toothed coupler and its end plane is also subjected to hydraulic pressure. At the same time the three-piece toothed coupler is in meshing, the output shaft can obtain an inward pulling force to prevent the output shaft from propping up only a very small distance.

3 Claims, 9 Drawing Sheets

(PAIOR ART)

FIG. 3 (PAIOR ART)

POSITIONING MECHANISM OF TURRET INDEX

FIELD OF INVENTION

The present invention is related to a kind of positioning mechanism of, a turret index which can increase the tool changing cyclic rate, and maintain the rigidity of output shaft so that the turret is more suitable for the user.

BACKGROUND OF THE INVENTION

In recent trends in evaluating the machining capabilities of a lathe, it is important not only to improve the cutting ability, the issue of shortening the automatic tool changing time of a turret is also an important factor to be considered in lathe design. A turret with high speed and high precision is the trend of CNC lathe design. The currently-used positioning mechanism of a turret index, as shown in FIG. 1, uses motor 10 and reducing gear set 11 as a transmission mechanism to drive output shaft 12 to perform the index rotation; Further the positioning pin 14 is pushed by electromagnetic actuator 13 to work out the preliminary positioning. Then the coupler 16 is meshed through the cam meshing mechanism 15 to attain precise positioning. The use of a turret index positioning pin to stop the rotational action caused by rapid large loading, will create an inertial bombardmental effect with loud noise and it can very easily damage the positioning pin 14 and cause failure of the turret index device.

Shown in FIG. 2, "Positioning Mechanism of Turret Index," is the invention described "Utility Model No. 85648 Patent" of the Republic of China. It transmits a dynamic input shaft 21 with hydraulic motor 20. The input shaft has a parallel conjugate cam 22 and a cylindrical cam 23 set up and fixed on it. There are a rotational disk 25 and a push ring 28 set up and fixed to its output shaft 24, moreover, it performs precise positioning with a three-piece toothed coupler 29, 30, 31, which are all in annular shapes wherein the first piece 29 is fixed to the push ring 28, the second piece 30 is fixed to the housing 32 and the third piece 31 is fixed to the output shaft 24 and its third piece 31 is located in the inner circle of its second piece 30. When hydraulic motor 20 drives both the conjugate cam 22 and cylinder cam 23 to rotate, it can cause the rocker arm 27 to move to the left or right and the rocker arm 27 can push the push ring 28 to move to the left or right so as to make the combining and separating operation among the first, second and third pieces of the three pieced toothed couple. As the three pieced toothed coupler is in separated condition among the first, second and third pieces, the conjugate cam 22 will pluck the roller 26 on the follower disk 25 and cause the follower disk to rotate to attain the object of making the output shaft 24 to perform index rotation. As the three-piece toothed coupler is in meshing condition among the first, second and third pieces, it can attain precise positioning.

When the tool on the output shaft (not shown in the Figures) performs machining on the workpieces, it will generate torsion. In order to prevent the first piece of the toothed coupler from being retreated and separated, a strong disk spring 33 is set up at one end of the cylindrical cam 23 in the mechanism as shown in FIG. 2. As the output shaft 24 is subjected to torsion while its tool is performing machining and when the first piece of the toothed coupler can not be retreated and separated, this torsional force can only cause the output shaft to generate a very small prop-up. This will affect the precision of machining. Also the operators need to undertake multiple indexing operations, that is, the toothed coupler requires multiple teeth's meshing bombardment whenever the operators intend to change the remote tools, thus, it not only can generate multiple bombarding noise, but also take time on operation. Furthermore, the design and machining efforts required for the cylindrical cam, slider and rocker arm are not easy, considering the cost, which will result in an increase in cost.

There is a U.S. Pat. No. 5,271,134 "Tool Turret with Axial Reactive Force", as shown in FIG. 3, to resolve the rigidity problem of the output shaft. The first piece of the three-piece toothed coupler in the precision positioning mechanism is to be activated by use of hydraulic system. As the oil flows into the oil chamber, the hydraulic acting force F1 applies on the first piece 34 of the toothed coupler which tightly presses the second and third pieces of the toothed coupler; in the same time, it makes use of the reacting force FR to apply on the push block 40, connecting ring 41 and gear rotating axis 37 to prevent the spindle from propping outward and losing its rigidity when the toothed coupler is meshing. But such reacting force FR is equal to the tight-pressed force F1 only and is unable to keep its rigidity. Hence a push block combination 38 is also designed, filling the oil chamber with hydraulic pressure, to generate hydraulic pushing force F2 so as to assist the reacting force FR possessing sufficient tightening force in axial direction to ensure rigidity, thereby, it becomes very complicated in the overall design.

The inventors, therefore, devoted themselves to study and consideration of the actual CNC lathe, in view of the existing shortcomings which includes inabilities to change tools at high speed and complicated design, of the custom-used turret index positioning mechanism, and eventually developed an improved precision positioning mechanism which not only can simplify the mechanism but also can change tools at high speed as well as keep the rigidity of the output shaft.

SUMMARY OF THE INVENTION

The main purpose of the present invention is to provide an improved turret index positioning mechanism with utmost simplified and compact mechanism to allow the turret to attain an utmost accurate positioning as well as keep the rigidity of the output shaft. By using a hydraulic system as the power source, it establishes a piston ring with an area, which is subjected to hydraulic pressure, greater than that of the moving block's inner end plane such that the output shaft can obtain a relatively greater tightening force in the axial; direction to keep it possessing sufficient rigidity. The area, which is subjected to hydraulic pressure, of the piston ring is designed to be double than the area, which is also subjected to hydraulic pressure, of the slider. Apart from being able to ensure the rigidity of the turret, the present invention, with its simplified design, is very beneficial in lowering cost and is easy to assemble and install.

The other purpose of the present invention is to provide a mechanism which can change tools at high speed by use of parallel conjugate cam of semi-rotational type to transmit the output shaft performing appropriate rotation of indexing (e.g. 8 index and up), so as to make the three piece toothed coupler mesh together to perform precise positioning. By doing so, it can raise the tool changing speed and reduce noise.

DETAILED DESCRIPTION OF THE INVENTION

Figure 1:
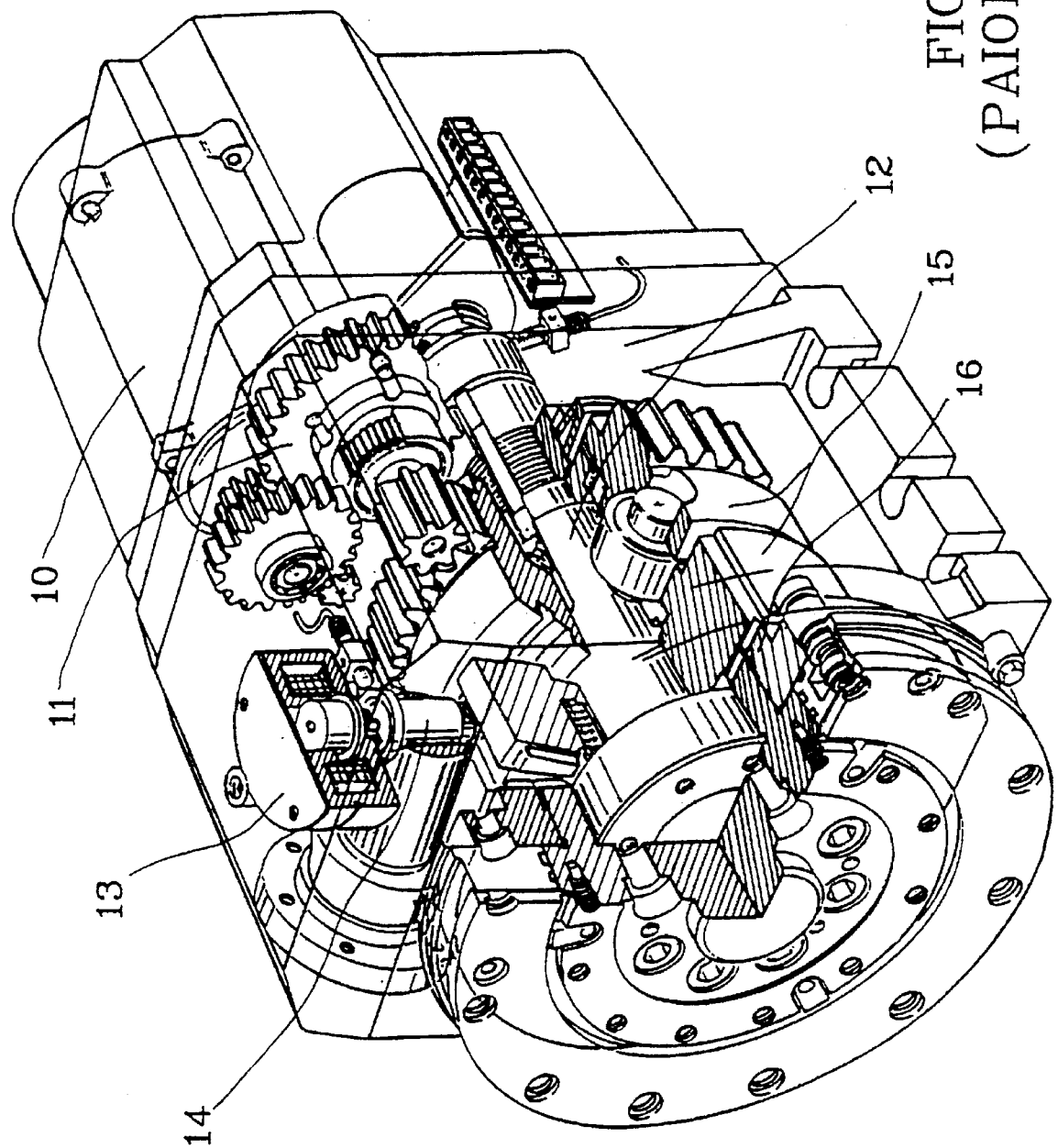
FIG. 1 is the schematic diagram of custom-used index positioning mechanism of turret.
Figure 2:
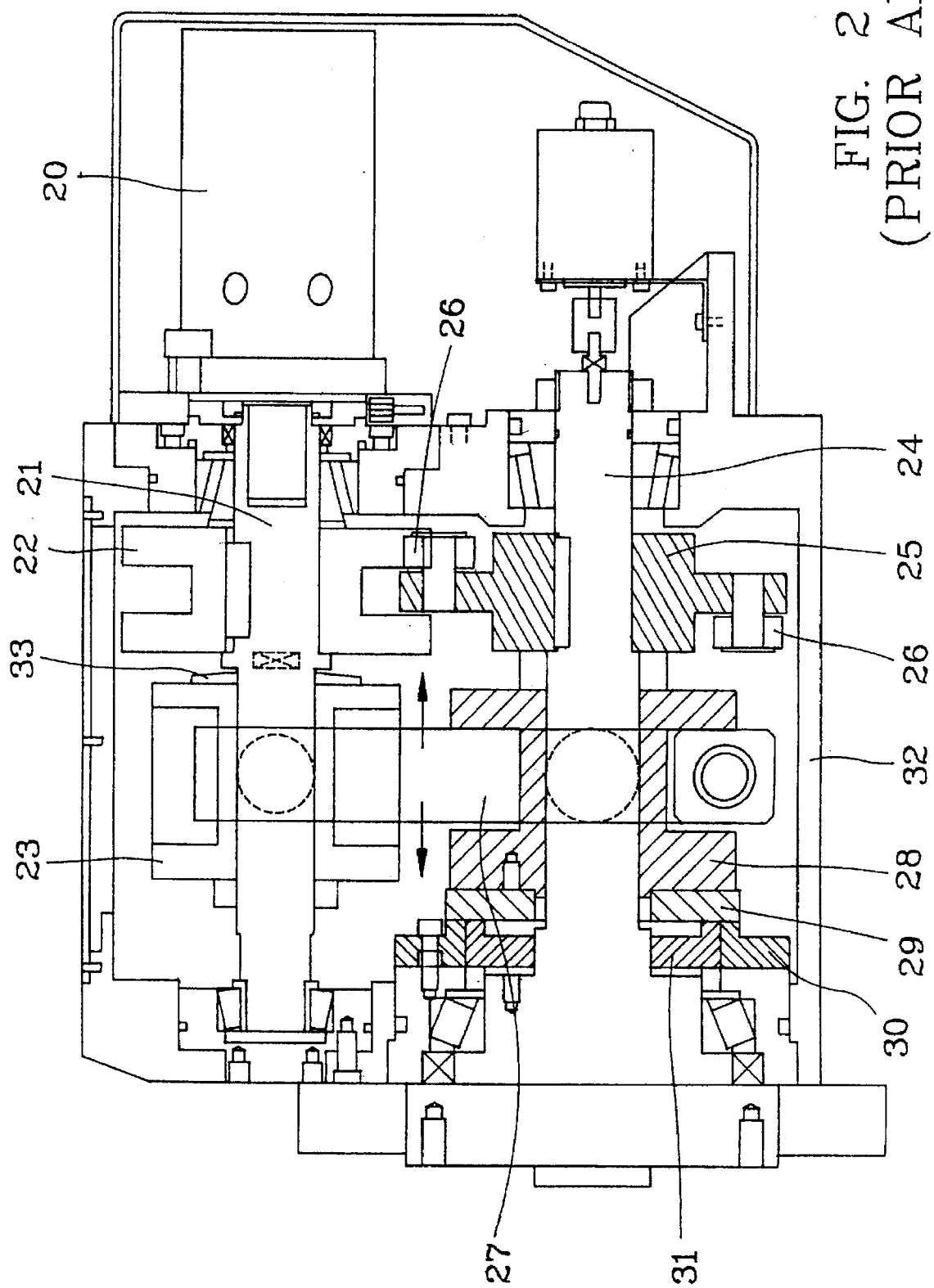
FIG. 2 is the structural schematic diagram of "Index Positioning Mechanism of Turret" shown in the utility model patent No. 85648 of the Republic of China.
Figure 3:
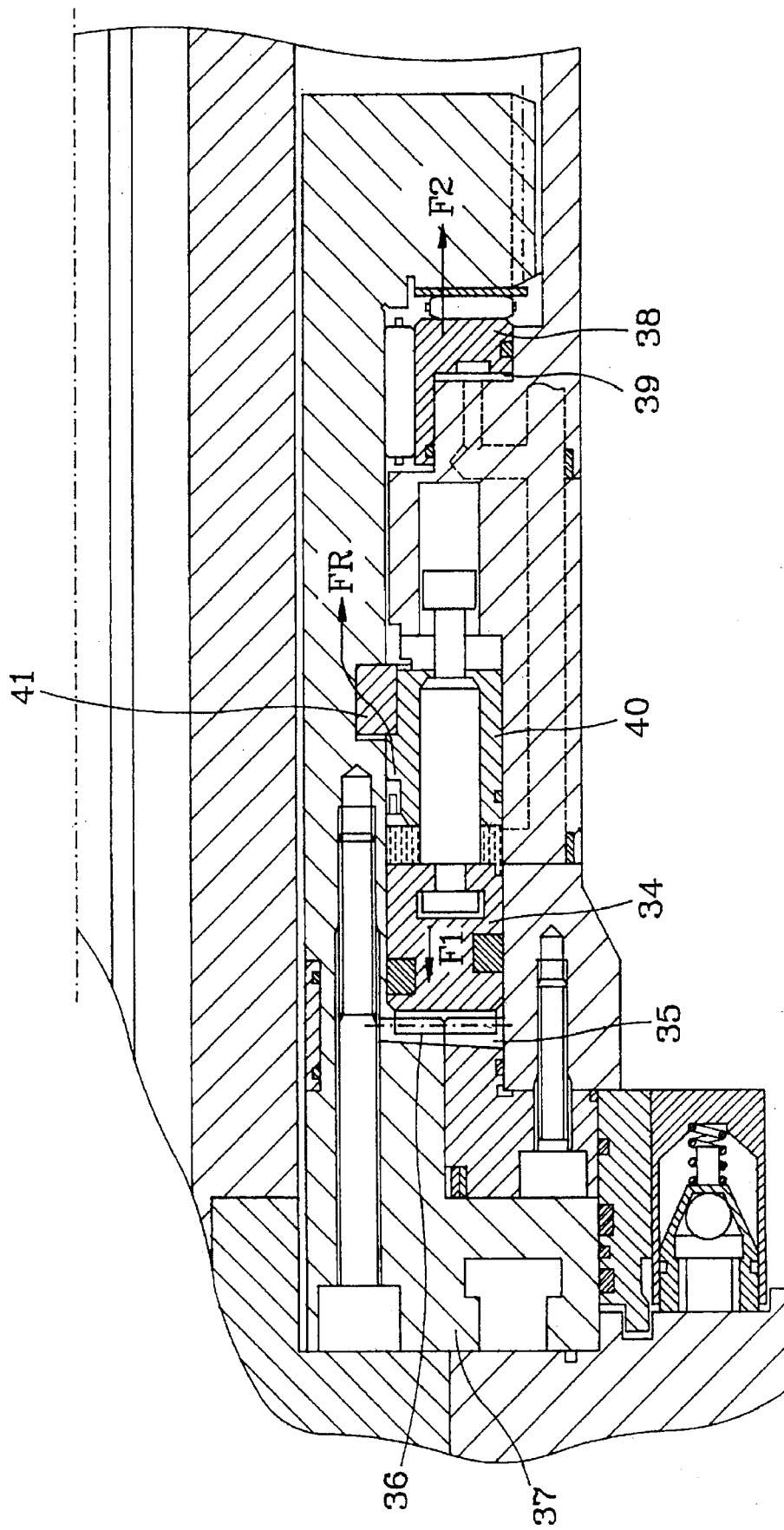
FIG. 3 is the structural schematic diagram of the "TOOL TURRET WITH AXIAL REACTIVE FORCE" of the U.S. Pat. No. 5,271,134.
Figure 4:
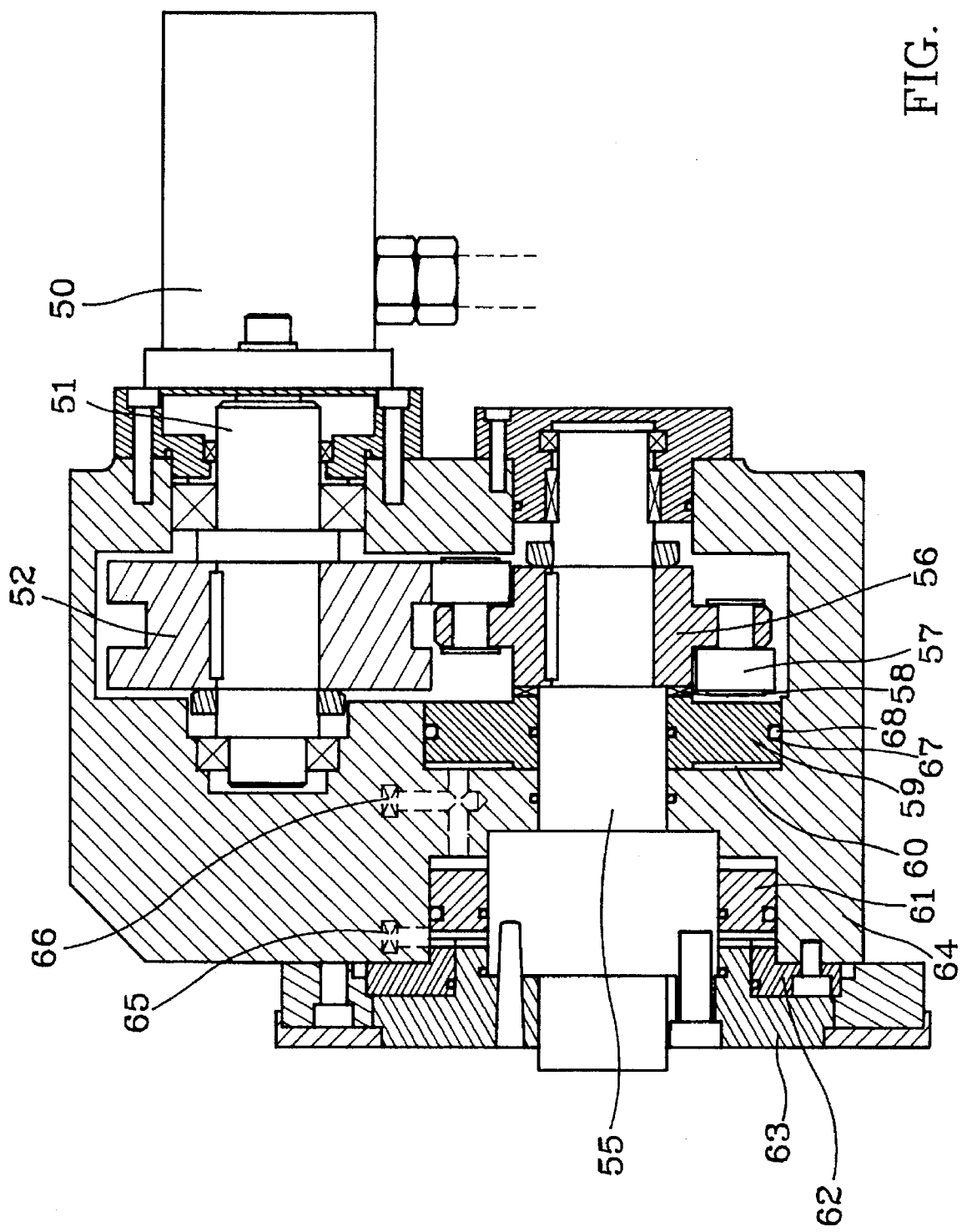
FIG. 4 is the schematic diagram of the present invention.
Figure 6:
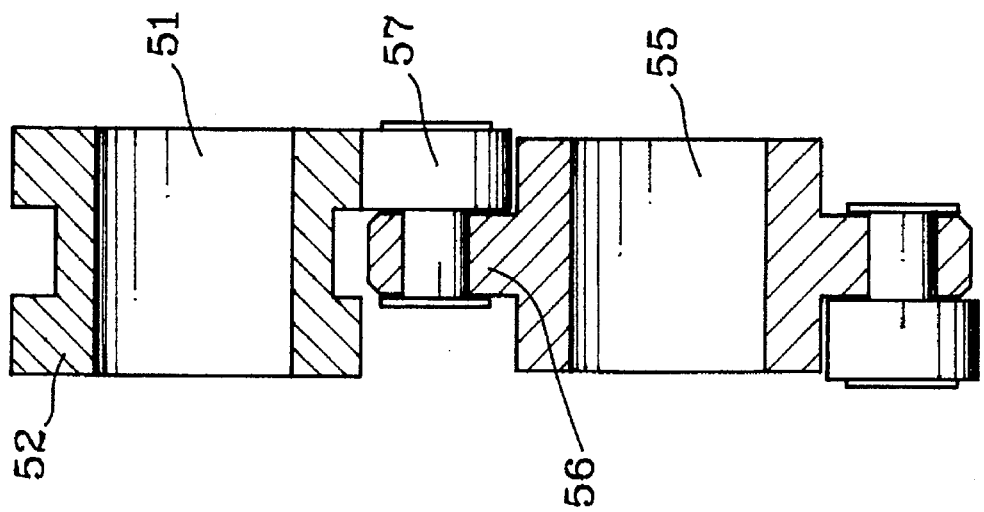
FIG. 6 is the sectional side view of FIG. 5.
Figure 7:
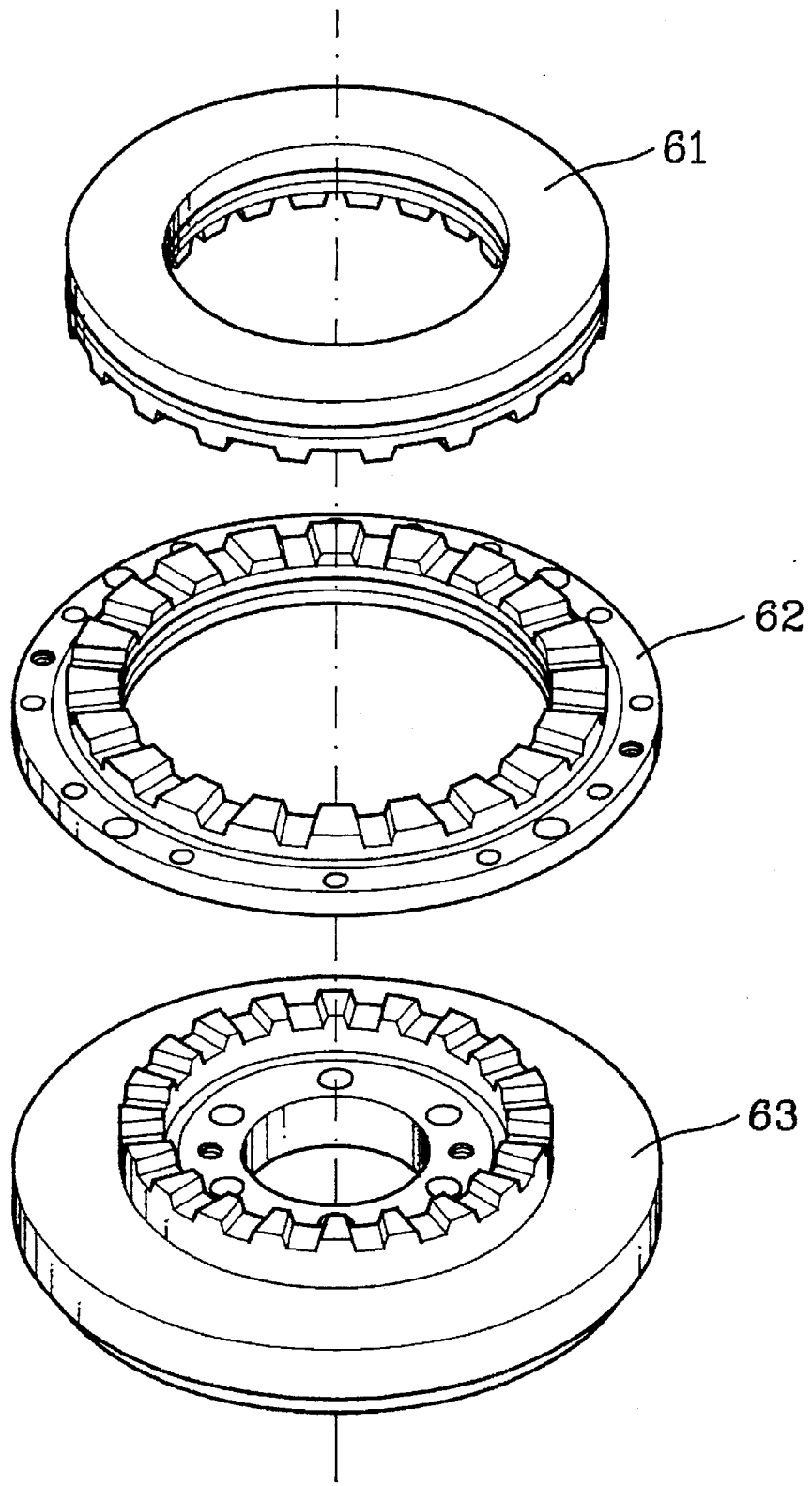
FIG. 7 is the three-dimensional analytical view of the three-piece toothed coupler.

Please refer to the schematic diagram of the present invention shown in FIG. 4. The present invention establishes an input shaft 51 and an output shaft 55 in which on the input shark 51, being driven by a hydraulic motor 50, is established and fixed a parallel conjugate cam 52 and on the output shall 55 is established and fixed a Follower disk 56 whose outer edge is set up with some rollers 57. It performs precise positioning (please refer to FIG. 7) by use of the three-piece toothed coupler 61, 62 and 63, which are all annular in shape wherein the first piece, being the moving block 61, is slipped on the outer ring of output shaft 55; the second piece, being the datum block 62 is fixed to the housing 64; and the third piece, being the rotation block 63, of the three-piece toothed coupler is located exactly in the inner ring of the second piece—the datum block 36 of the three-piece toothed coupler. The parallel conjugate cam 52 will pluck the output shaft to perform index rotation when the hydraulic motor 50 rotates.

Figure 5:
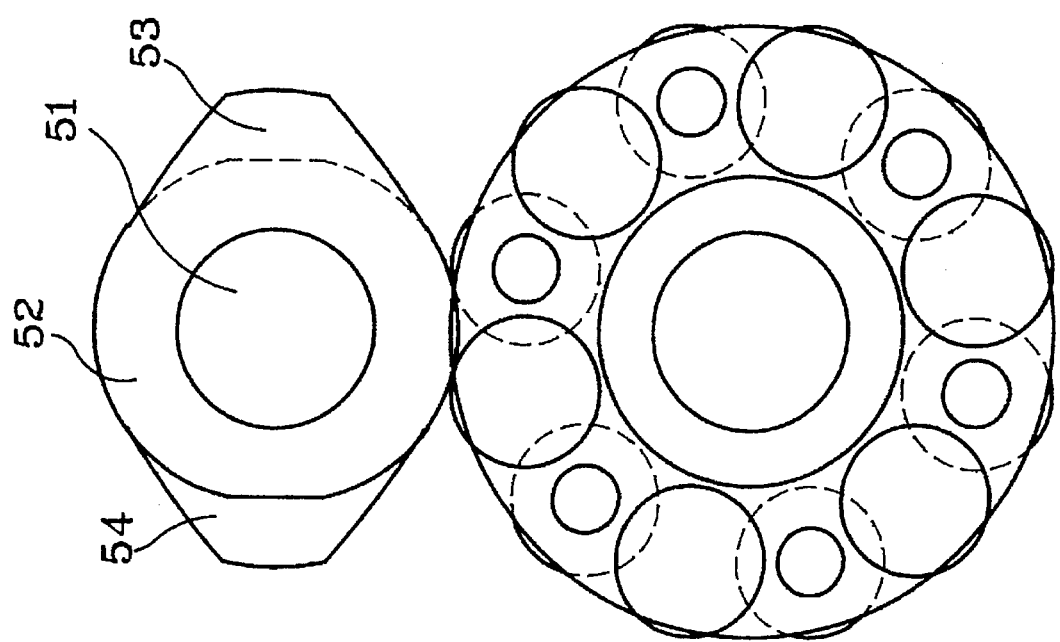
FIG. 5 is the assembly diagram of the parallel conjugate cam mechanism of the semi-rotational type.

The parallel conjugate cam 52 on the said input shaft 51 is a parallel conjugate cam 52 of the semi-rotation type which is a combination of a upper cam 53 and a lower cam 54 that are correspondent to each other and have their cam lobes located 180° apart as shown in FIG. 5. The number of rollers 57 on the follower disk 56 can be reduced accordingly to be the same as the index number and each time the rotational type parallel conjugate cam 52 rotates a half turn, it can dial the follower disk 56 to undertake an index rotation. Thereby, it can increase the speed of the index operation. It sets up a bearing 58, an annular concave plane 60 at the outer edge plane of the said piston ring 59. The area of the said annular concave plane 60 is twice as large as that of the inner plane of the moving block 61 of the toothed coupler. The moving block 61 is driven by a hydraulic system where the first oil passage 65 is the one that hydraulic pressure enters the moving block 61's outer plane of the toothed coupler via electromagnetic valve and the second oil passage 66 controlled by electromagnetic valve is the one which can control the hydraulic pressure from entering the inner plane of the moving block 61 and the annual concave plane 60 of the outer edge plane 60 of the piston ring 59. The electromagnetic valve used can be one with four openings and two positions. We will not explain this in detail since the application of the electromagnetic valve is well known in the art.

Figure 8:
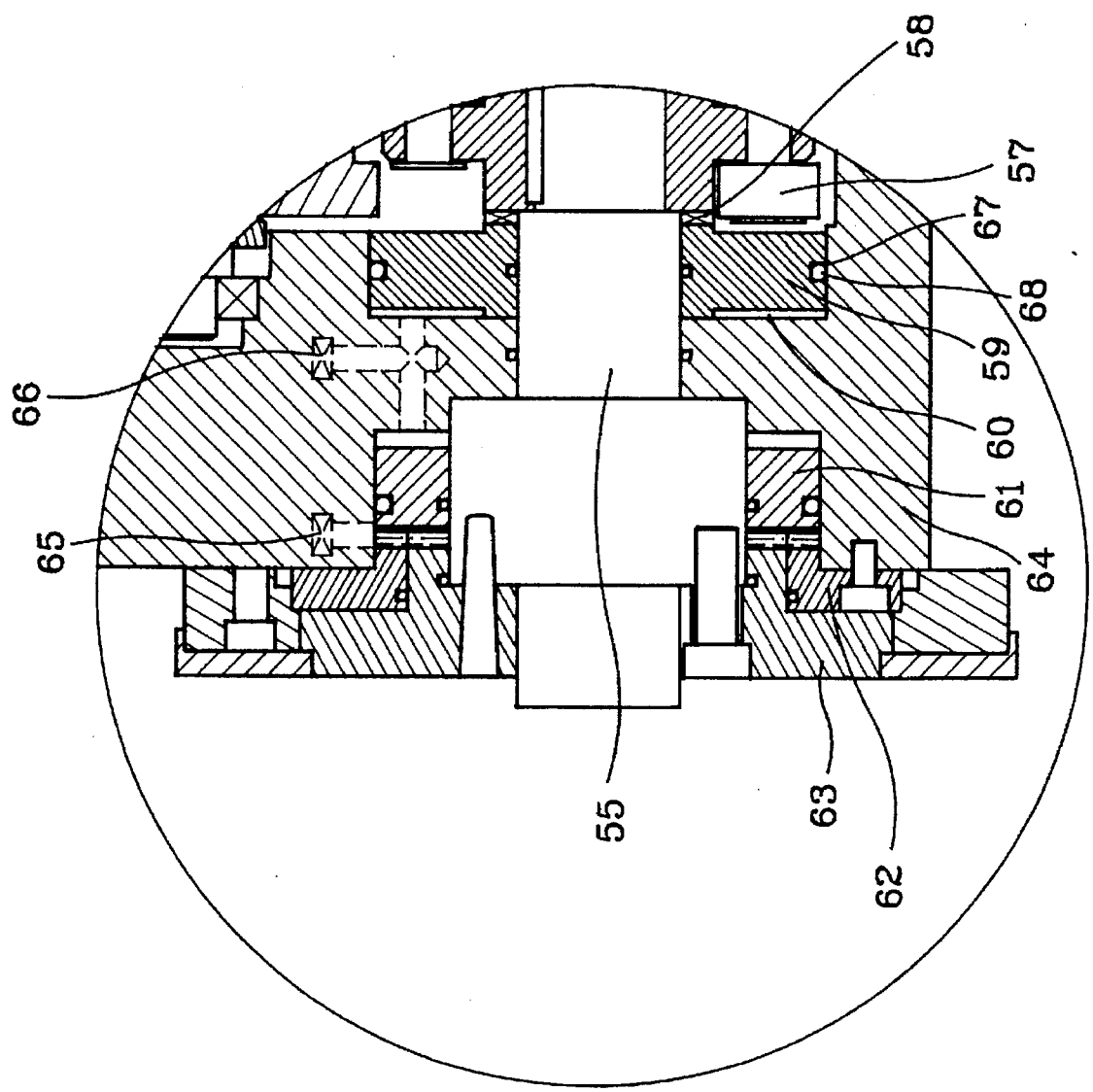
FIG. 8 is a sectional view of the three-piece toothed coupler in which the moving block is engaged with the datum block.
Figure 9:
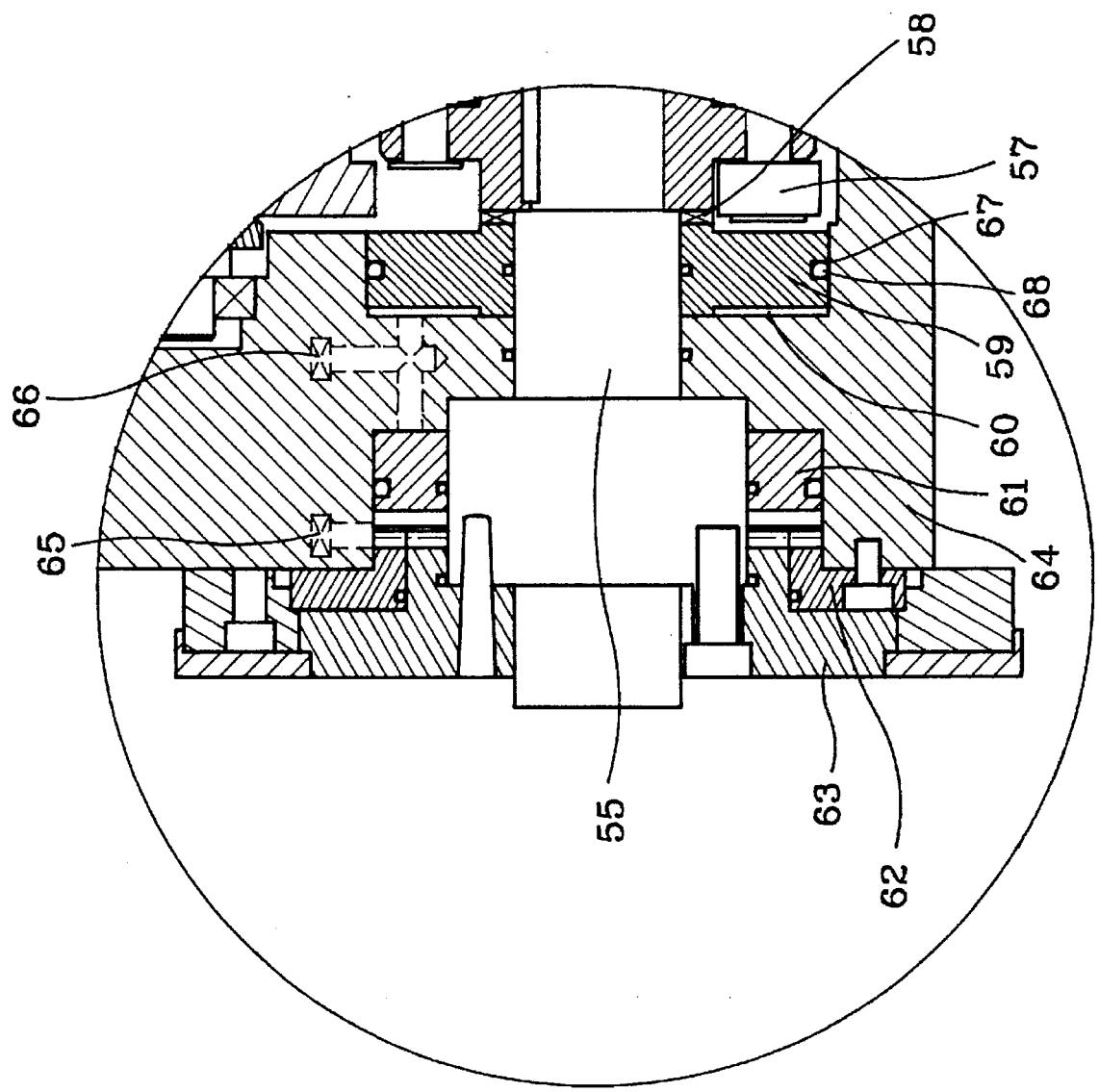
FIG. 9 is a sectional view of the three-piece tooth coupler in which the moving block is separated from the datum block.

When the present invention is going to be implemented for the operation of an index rotation, it first closes the second oil passage 66 of the electromagnetic valve. When the first oil passage 65 is open, oil can enter the outer plane of the moving block 61 of the toothed coupler and push the moving block 61 off the datum block 62 and rotation block 63 so that the output shaft 55 is rotational. It further makes the hydraulic motor 50 drive the parallel conjugate cam 52 to rotate a half turn, and its upper cam 53 (or Lower cam 54) can pluck the follower disk 56 to rotate which causes the output shaft 55 to rotate a graduation. It then causes the electromagnetic valve's first oil passage 65 to close. When the electromagnetic valve's second oil passage 66 is open, oil passage 65 will close. When the electromagnetic valve's second oil passage 66 is open, oil will enter the inner edge plane of the moving block 61 to push the moving block 61 to move outward so as to engage with the datum block 62 and rotation block 63 (as shown in FIG. 8), to attain precision positioning; in the same time, oil will enter into the annular concave plane 60 of the piston ring 59 to provide the piston ring 59 with an inward pressure which can prevent the output shaft 55 from propping up a very small distance to assure the rigidity of the output shaft 55 when the three pieces 61, 62 and 63 of the toothed coupler are meshed together, since the area of the piston ring 59 subjected to hydraulic pressure is greater than the area of the moving block 61 subjected to hydraulic pressure.

The present invention can increase the tool changing cyclic rate since it makes use of the rotational type parallel conjugate cam 52 having upper and lower cams 53 and 54 that can operate the output shaft to rotate a graduation for each half turn of rotation. The number of rollers 57 on the follower disk 56 can be reduced to a half of those that are commonly used. Therefore, volume of the follower disk 56 can be reduced accordingly. Also, it needs to drive the hydraulic system to perform the meshing operation of the toothed coupler's three pieces 61, 62 and 63 only when the rotated indexing attains correct position by plucking the follower disk 56 when it comes to changing remote tools since the operation of the precision positioning of the present invention is performed by a hydraulic system and has nothing to do with the input shaft 51. Therefore, it needs only to make the three pieces 61, 62 and 63 of the toothed coupler to perform meshing once, even though one needs to change remote tools. Thereby, one can not only increase the tool changing cyclic rate but also reduce noise as will as maintain the toothed coupler.

Figure 10:
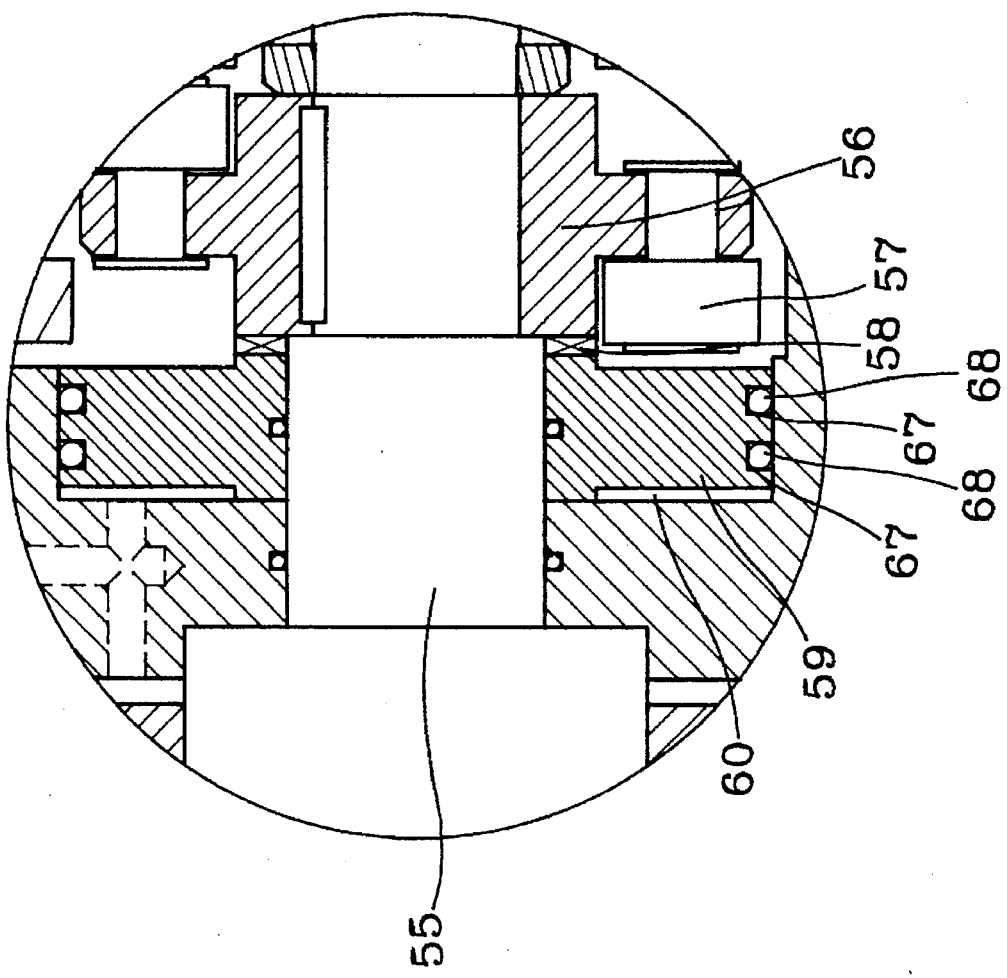
FIG. 10 is the other embodiment example of the piston ring of the present invention.

The piston ring 59 used by the present invention can have more than one ring groove 67 at its circumference plane and embed an O-ring 68 in each of the ring grooves 67 as shown in FIG. 10 to make the piston ring 59 obtain a relatively greater tightening force in the axial direction.

The present invention has attained the object of simplifying its mechanism to use a hydraulic system as the operation power of the three-piece toothed coupler 61, 62 and 63. It also uses the piston ring 59 to provide the output shaft 55 with rigidity to prevent it from propping up a very small distance. It is not only effective but also compact and simple and is an ideal design.

To summarize the above-mentioned statements, the present invention provides an ideal design of a turret index precision positioning mechanism with a compact and simple structure and low manufacturing cost. It can change tools at high speeds and ensure the rigidity of output shaft 55.

What is claimed is:

1. A positioning mechanism for use in a turret index comprising:

an output shaft which includes an output shaft pivot and performs precise positionings by use of a three-piece toothed coupler and first and second oil passages;

said three-pieced toothed coupler comprises a first piece, a second piece, and a third piece, all of which are annular in shape, wherein said first piece, which is called a moving block, is slidably mounted to an outside surface of said output shaft, said second piece, which is called a datum block, is fixed to a housing for said three-pieced toothed coupler, and said third piece, which is called a rotation block, is fixed to said output shaft; further wherein said third piece is exactly located in an inner circle of said second piece of the said three-piece toothed coupler, and said moving block has an inner end surface;

said output shaft pivot comprises a piston ring which establishes an annularly-shaped concave plane at an outside end plane, said annularly-shaped concave plane has an area is greater than the area of said inner end surface of said moving block of the said toothed coupler;

wherein said moving block is configured to be driven by a hydraulic device, via said first and second oil passages such that said first oil passage, which is controlled by a first electromagnetic valve, enters at an outer end plane of said moving block of the toothed coupler, and said second oil passage, which is controlled by a second electromagnetic valve, simultaneously enters said inner end surface of said moving block and said annularly-shaped concave plane of said outside end plane of said piston ring.

2. A positioning mechanism for use in a turret index as claimed in claim 1 which further comprises at least one ring groove formed at a circumferential plane of said piston ring, and a waterproof O-ring provided in said ring groove.

3. A positioning mechanism for use in a turret index as claimed in claim 1, wherein said piston ring is arranged adjacent to a follower disk which is fixed to the said output shaft and is driven by a parallel conjugate cam.

* * * * *